(12) United States Patent
Fujikawa (10) Patent No.: US 10,001,682 B2
(45) Date of Patent: Jun. 19, 2018

(54) ELECTROOPTIC DEVICE AND ELECTRONIC DEVICE

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/371,041

(22) Filed: Dec. 6, 2016

(65) Prior Publication Data

US 2017/0184903 A1   Jun. 29, 2017

(30) Foreign Application Priority Data

Dec. 28, 2015 (JP) .................. 2015-256069

(51) Int. Cl.
*G02F 1/1345* (2006.01)

(52) U.S. Cl.
CPC ...... *G02F 1/13458* (2013.01); *G02F 1/13452* (2013.01); *G02F 2001/13456* (2013.01)

(58) Field of Classification Search
CPC ....... G02F 1/13452; G02F 2001/13456; G02F 1/13458
See application file for complete search history.

(56) References Cited

U.S. PATENT DOCUMENTS 6,297,868 B1 * 10/2001 Takenaka ............ G02F 1/13452
349/151
2004/0159930 A1   8/2004 Makita et al.

FOREIGN PATENT DOCUMENTS

| JP | 2004-095756 A | 3/2004 |
| JP | 2004-118089 A | 4/2004 |
| JP | 2010-093014 A | 4/2010 |
| JP | 2010-266783 A | 11/2010 |

* cited by examiner

*Primary Examiner* — Phu Vu
(74) *Attorney, Agent, or Firm* — Oliff PLC (57) ABSTRACT

An electrooptic device includes a liquid crystal panel as an electrooptic panel, a first terminal group provided on the liquid crystal panel, the first terminal group including a plurality of terminals arranged in an X direction, and a second terminal group provided on the liquid crystal panel at a position separated from the first terminal group in a Y direction different from the X direction, the second terminal group including a plurality of terminals arranged in the X direction at a terminal arrangement pitch different from that of the first terminal group.

8 Claims, 7 Drawing Sheets

ELECTROOPTIC DEVICE AND ELECTRONIC DEVICE

BACKGROUND

1. Technical Field

The present invention relates to a technique for increasing the number of terminals to be provided on an electrooptic panel.

2. Related Art

Electrooptic panels such as liquid crystal panels have many terminals mounted thereon, and the number grows increasingly as more pixels are provided on the electrooptic panels, and due to other reasons. To reduce an increase in the size of the electrooptic devices while increasing the number of terminals, a method for reducing the arrangement pitches of terminals is provided. In other methods, a plurality of flexible printed circuits (FPCs) or a plurality of chip on film (COF) assemblies are attached to an electrooptic panel, or terminals are mounted along a plurality of sides of a display area (for example, see JP-A-2010-93014, JP-A-2004-118089, and JP-A-2010-266783).

The methods of attaching a plurality of wiring boards such as FPCs or COF assemblies to an electrooptic panel, however, may increase the number of steps for mounting the wiring boards on the electrooptic panel, and may complicate the routing of the electrooptic panel on which the wiring boards such as FPCs or COF assemblies are mounted. Similarly, the arrangement in which terminals are mounted along a plurality of sides in a display area increases the size of the electrooptic panel and complicates the arrangement of associated components, and accordingly, the arrangement results in an increase in the production cost.

SUMMARY

An advantage of some aspects of the invention is that there is provided a technique for increasing the number of terminals to be provided on an electrooptic panel while reducing complications in the routing of wires to the electrooptic panel.

An electrooptic device according to an aspect of the invention includes an electrooptic panel, a first terminal group provided on the electrooptic panel, the first terminal group including a plurality of terminals arranged in a first direction, and a second terminal group provided on the electrooptic panel at a position separated from the first terminal group in a second direction different from the first direction, the second terminal group including a plurality of terminals arranged in the first direction at a terminal arrangement pitch different from that of the first terminal group.

The electrooptic panel according to this aspect of the invention includes the first terminal group and the second terminal group. Both of the terminals in the first terminal group and in the second terminal group are arranged in the first direction, and the terminal groups are disposed at positions separated from each other in the second direction. Furthermore, in the first terminal group and the second terminal group, the arrangement pitches of at least a part of the terminals are different from each other. If the positioning of a wiring board to the terminal group having a smaller arrangement pitch is performed first, the alignment operation in the process of attaching the wiring board to the electrooptic panel can be facilitated. This is because if a terminal group that requires a higher positioning accuracy is aligned first, a terminal group that requires a lower positioning accuracy can be simultaneously aligned. With this operation, a single FPC or COF assembly can be attached to the plurality of terminal groups. Consequently, complications in the routing of the wires to the electrooptic panel can be reduced, and the number of terminals to be provided on the electrooptic panel can be increased.

In this aspect of the invention, a wiring board having an integrated circuit for supplying signals to at least one of the terminals in the first terminal group and the second terminal group may be attached to the electrooptic panel. According to this aspect, in a structure in which a wiring board (COF assembly) is attached to the electrooptic panel, complications in the routing of the wires can be reduced, and the number of terminals that can be brought into electrical contact with the integrated circuit provided on the wiring board can be increased.

According to this aspect of the invention, the wiring board may have a notched section provided in an area between a part corresponding to the first terminal group and a part corresponding to the second terminal group. According to this aspect, the positioning of the wiring board can be performed with reference to the position of the notched section provided in the wiring board, and thereby the alignment operation in attaching the wiring board to the electrooptic panel can be facilitated. As will be described in detail below, if a contact for inspection of a wiring board (COF assembly) is provided on the notched section, an unintentional short circuit can be prevented, and the usage efficiency of the material tape of the COF assembly can be increased, and thereby the manufacturing cost of the COF assembly can be reduced.

According to this aspect of the invention, alignment marks may be provided such that the wiring board can be positioned at a location corresponding to at least one terminal group having a smallest arrangement pitch from the first terminal group and the second terminal group. According to this aspect, the alignment marks are provided such that the positioning of the wiring board (COF assembly) to a terminal group having a smallest arraignment pitch can be performed first, and thereby the alignment operation in attaching the COF assembly to the electrooptic panel can be facilitated. Accordingly, the COF assembly can be attached to the plurality of terminal groups.

According to this aspect of the invention, a wiring board having a wire to be electrically connected to at least one of the terminals in the first terminal group and the second terminal group may be attached to the electrooptic panel. According to this aspect, in a structure in which a wiring board (FPC) is attached to the electrooptic panel, complications in the routing of the wires can be reduced, and the number of terminals that can be brought into electrical contact with the wires provided on the FPC can be increased.

According to this aspect of the invention, the wiring board may have a notched section provided in an area between a part corresponding to the first terminal group and a part corresponding to the second terminal group. According to this aspect, the positioning of the wiring board (FPC) can be performed with reference to the position of the notched section provided in the FPC, and thereby the alignment operation in attaching the FPC to the electrooptic panel can be facilitated. As will be described in detail below, if a contact for inspection of an FPC is provided on the notched section, an unintentional short circuit can be prevented, and the usage efficiency of the material tape of the FPC can be increased, and thereby the manufacturing cost of the FPC can be reduced.

According to this aspect of the invention, alignment marks may be provided such that the wiring board can be positioned at a location corresponding to at least one terminal group having a smallest arrangement pitch from the first terminal group and the second terminal group. According to this aspect, the alignment marks are provided such that the positioning of the wiring board (FPC) to a terminal group having a smallest arraignment pitch can be performed first, and thereby the alignment operation in attaching the FPC to the electrooptic panel can be readily performed. Accordingly, the single FPC can be attached to the plurality of terminal groups.

According to this aspect of the invention, one of the terminals in one terminal group not having a smallest arrangement pitch from the first terminal group and the second terminal group may be used as an inspection terminal to which signals for inspecting the electrooptic panel are input. According to this aspect, it is not necessary to separately provide the terminal to which signals for inspecting the electrooptic panel are input in addition to terminals to which signals for driving the electrooptic panel are input.

According to this aspect of the invention, the electrooptic panel may have a plurality of pixels, the first terminal group may be provided at a position closer to the pixels than the second terminal group, and a maximum arrangement pitch in the first terminal group may be smaller than a smallest arrangement pitch in the second terminal group. According to this aspect, between the first terminal group and the second terminal group, one terminal group that has a smallest arrangement pitch and requires a higher accuracy in the alignment operation to avoid an interfering material such as a counter substrate is positioned at a location closer to the pixels provided on the electrooptic panel. Consequently, while complications in the routing of the wires can be reduced, the number of terminals to which signals for driving the pixels on the electrooptic panel can be increased.

According to this aspect of the invention, the first terminal group may include a terminal to which signals for supplying video signals to each of the pixels are input. According to this aspect, while complications in the routing of the wires can be reduced, the number of terminals for supplying video signals to the pixels on the electrooptic panel can be increased.

An aspect of the invention may be implemented as electrooptic devices and electronic devices.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention will be described with reference to the accompanying drawings, wherein like numbers reference like elements. It should be noted that the Figures used for reference in the description below are not necessarily to scale to illustrate each member, area, and the like in a recognizable size.

Figure 1:
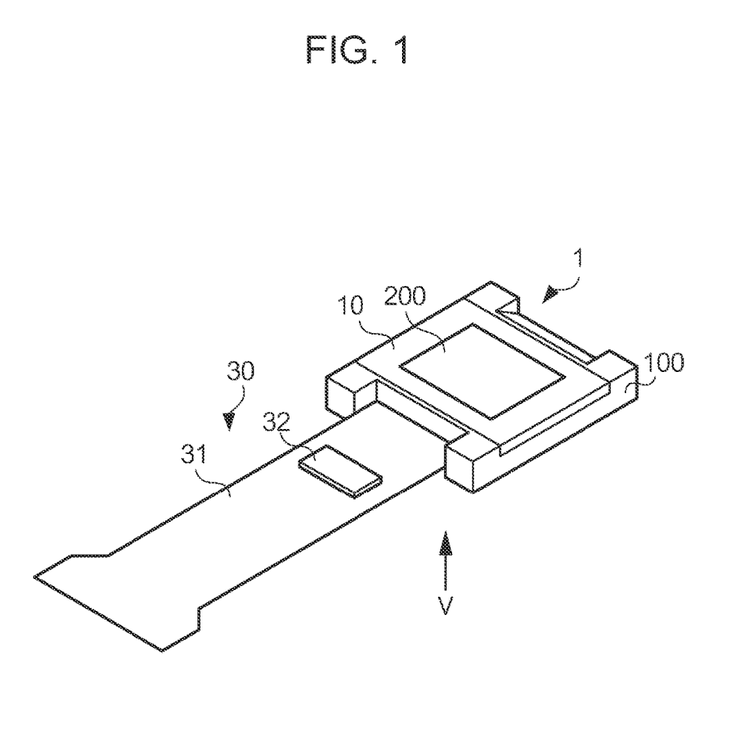
FIG. 1 is a perspective view illustrating a structure of an electrooptic device according to an embodiment of the present invention.

FIG. 1 is a perspective view illustrating a structure of an electrooptic device 1 according to an embodiment of the present invention. The electrooptic device 1 is a liquid crystal device in this embodiment. The electrooptic device 1 includes a liquid crystal panel 10. The liquid crystal panel 10 is an example electrooptic panel that performs electrooptic operations, and in this embodiment, the liquid crystal panel 10 is a transmissive liquid crystal panel. The electrooptic operations include a display operation for displaying an image on a pixel area 200 in the liquid crystal panel 10.

The electrooptic device 1 includes a wiring board (COF assembly) 30 and a case 100. The liquid crystal panel 10 is accommodated in the frame-shaped case 100 that is opened in a display section, and one end of the wiring board 30 is attached to the liquid crystal panel 10. The wiring board 30 includes an FPC 31, and an integrated circuit 32 that is provided on the FPC 31. The FPC 31 has an insulation base material such as polyimide, and wires (wires 311 in FIG. 5, which will be described below) formed by patterning on the base material. The integrated circuit 32 serves as a control circuit that performs control to drive the liquid crystal panel 10. The integrated circuit 32 is mounted on the FPC 31 by COF technology and electrically connected to a circuit (not illustrated) on a higher level.

Figure 2:
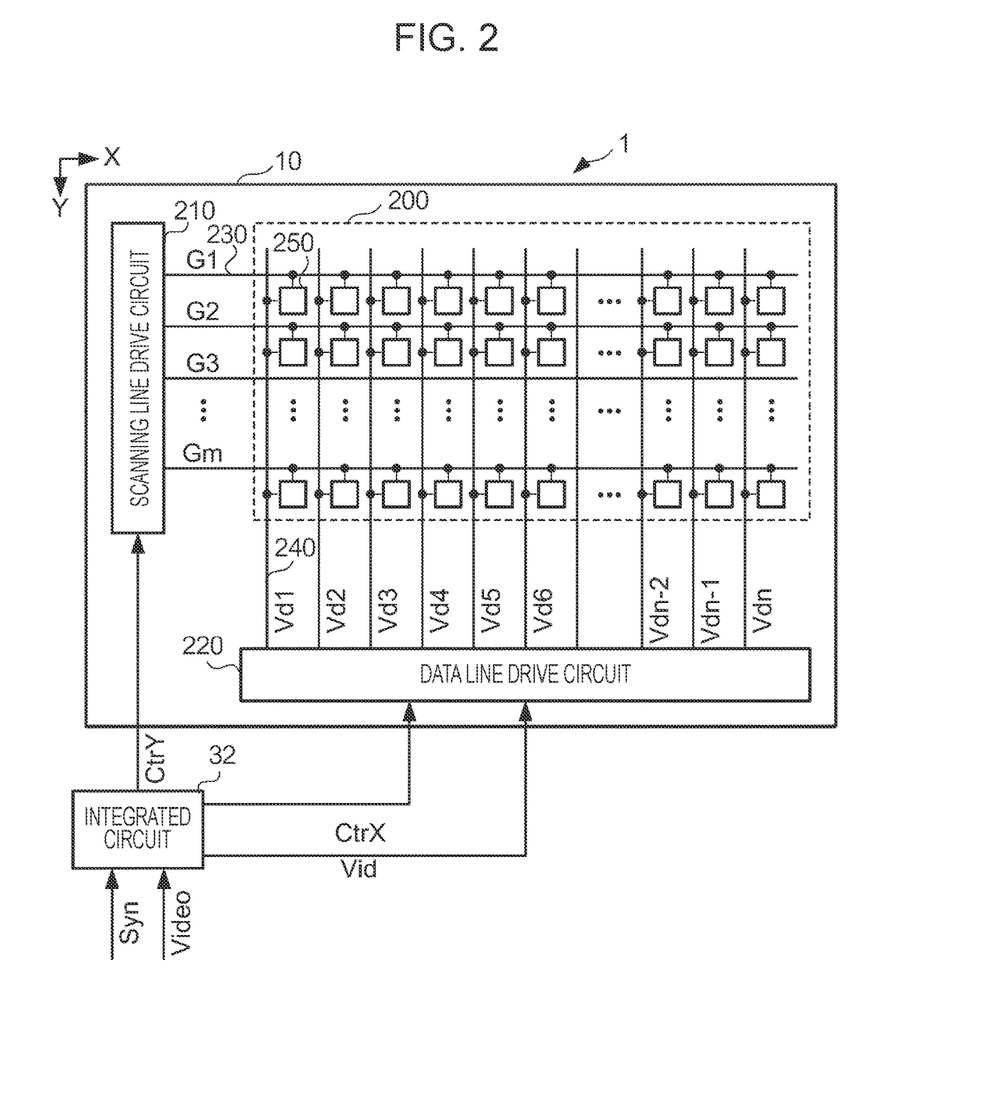
FIG. 2 is a block diagram of an electric configuration of the electrooptic device according to the embodiment.

FIG. 2 is a block diagram illustrating an electric configuration of the electrooptic device 1. Image data Video is supplied to the integrated circuit 32 in synchronization with synchronizing signals Syn from the circuit on the higher level. The image data Video is, for example, 8-bit digital data that defines a level of gray for each pixel 250 to display on the liquid crystal panel 10. The synchronizing signals Syn include vertical synchronizing signals, horizontal synchronizing signals, and dot clock signals. The integrated circuit 32 generates control signals CtrX and CtrY that are signals for controlling the liquid crystal panel 10 based on the synchronizing signals Syn, and supplies the signals to the liquid crystal panel 10. The integrated circuit 32 generates analog video signals Vid based on the image data Video, and supplies the signals to the liquid crystal panel 10. The video signal Vid indicates a potential for determining transmittance of a liquid crystal element (liquid crystal element 254 described below) corresponding to the pixel 250 to display at the level of gray defined by the image data Video.

In the pixel area 200, a plurality of pixels 250 are arrayed. Specifically, in the pixel area 200, m rows of scanning lines 230 extend in the X direction in FIG. 2, and n columns of data lines 240 extend in the Y direction which is orthogonal to the X direction in FIG. 2, and the data lines 240 and the scanning lines 230 are electrically insulated from each other. The X direction is an example first direction according to the embodiment of the invention. The Y direction is an example second direction according to the embodiment of the invention. The pixels 250 are provided so as to correspond to the respective intersections of the m rows of scanning lines 230 and the n columns of data lines 240. In other words, the pixels 250 are arranged in a matrix of m rows×n columns (m-by-n matrix), where m and n are natural numbers.

The liquid crystal panel 10 further includes a scanning line drive circuit 210 and a data line drive circuit 220. The scanning line drive circuit 210 selects the first to mth rows of scanning lines 230 one by one in one frame period in a predetermined order according to the control signal CtrY supplied from the integrated circuit 32, and outputs scanning signals G1 to Gm respectively to the selected first to mth rows of scanning lines 230, where one frame period denotes a time period needed for the electrooptic device 1 to display one image frame.

The data line drive circuit 220 generates video signals (data signals) Vd1 to Vdn for determining levels of gray to be displayed by the respective pixels 250 according to the video signals Vid and the control signals CtrX supplied from the integrated circuit 32, and outputs the video signals Vd1 to Vdn to the respective n columns of data lines 240. In this embodiment, the video signals Vid output from the integrated circuit 32 are analog signals, and alternatively, the video signals Vid may be digital signals. In such a case, the data line drive circuit 220 performs digital-to-analog (D/A) conversion to the digital video signals to generate analog video signals Vd1 to Vdn.

Figure 3:
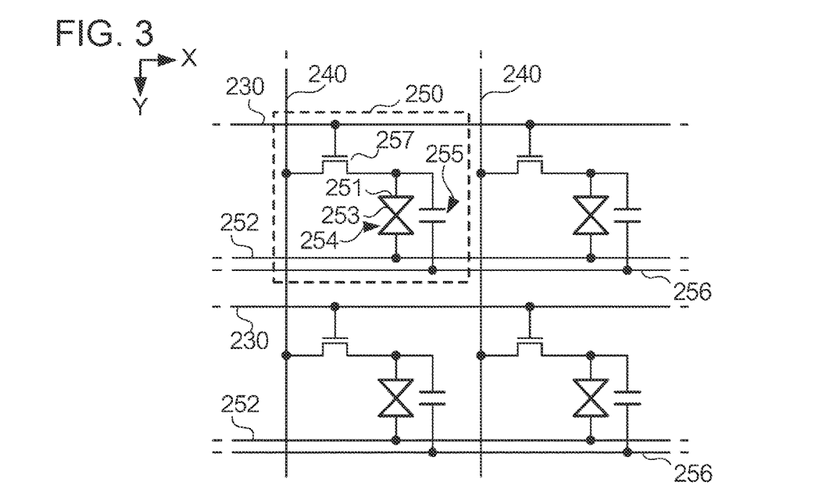
FIG. 3 illustrates an equivalent circuit in a liquid crystal panel according to the embodiment.

FIG. 3 illustrates an equivalent circuit in the liquid crystal panel 10. As illustrated in FIG. 3, each of the pixels 250 includes a liquid crystal element 254 that has a pixel electrode 251, a common electrode 252, and a liquid crystal 253. The liquid crystal 253 is sandwiched between the pixel electrode 251 and the common electrode 252. In the pixel 250, the orientation of the molecules of the liquid crystal 253 changes depending on an electric field generated by the pixel electrode 251 and the common electrode 252. Accordingly, if the liquid crystal element 254 is a transmissive liquid crystal element, the liquid crystal element 254 has a transmittance corresponding to an applied holding voltage. In the liquid crystal panel 10, the transmittance varies in each of the pixels 250. Although not illustrated in FIG. 2, an auxiliary capacitor (storage capacitor) 255 is provided in parallel to each pixel 250 as illustrated in FIG. 3 in an actual configuration. One end of the auxiliary capacitor 255 is connected to the pixel electrode 251, and the other end is commonly connected to a capacitor line 256. The voltage across capacitor line 256 is temporally maintained in a constant value.

In response to a selection of the scanning line 230, the scanning signal is supplied to turn on a thin film transistor (TFT) 257 to which the scanning line 230 is connected via a gate electrode, and the pixel electrode 251 is electrically connected to the data line 240. In response to supply of the video signals Vd1 to Vdn to the data line 240, the video signals are applied to the pixel electrode 251 via the TFT 257 which has been turned on. The TFT 257 is turned off while the scanning line 230 is not selected, and in this state, the voltage applied to the pixel electrode 251 is maintained by the capacitor in the pixel 250, and also maintained in the auxiliary capacitor 255 connected in parallel to the pixel 250. In this embodiment, a vertical alignment (VA) liquid crystal 253 is employed, and the liquid crystal 253 operates in a normally black mode in which each of the pixels 250 is in a black state when no voltage is applied.

Figure 4:
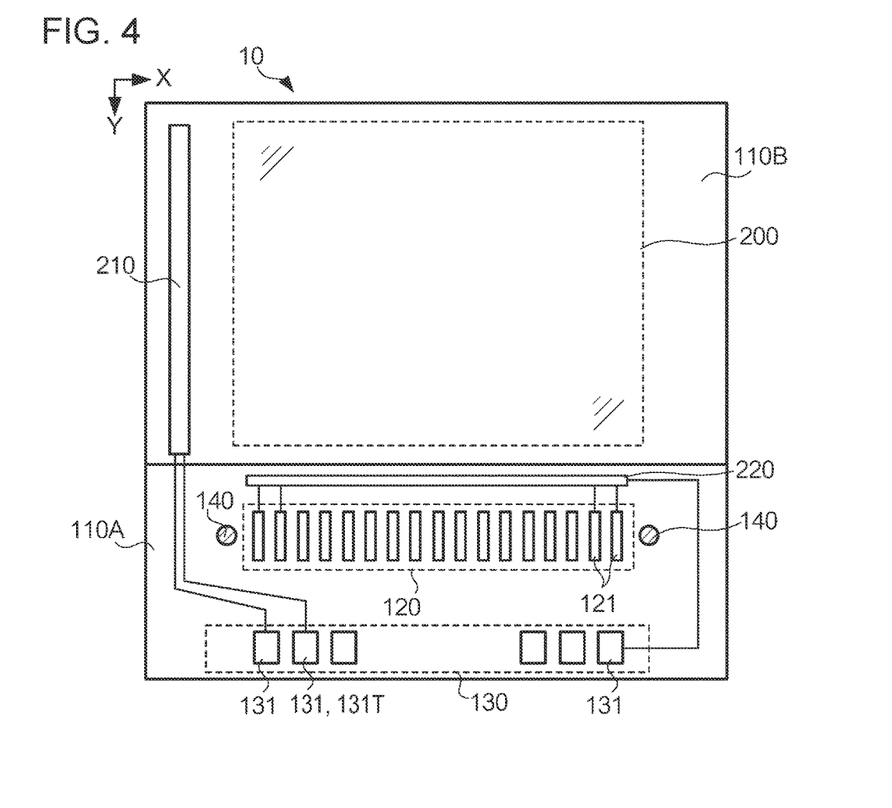
FIG. 4 is a plan view of a liquid crystal panel according to the embodiment on which terminals are provided and a COF assembly is not attached thereto.
Figure 5:
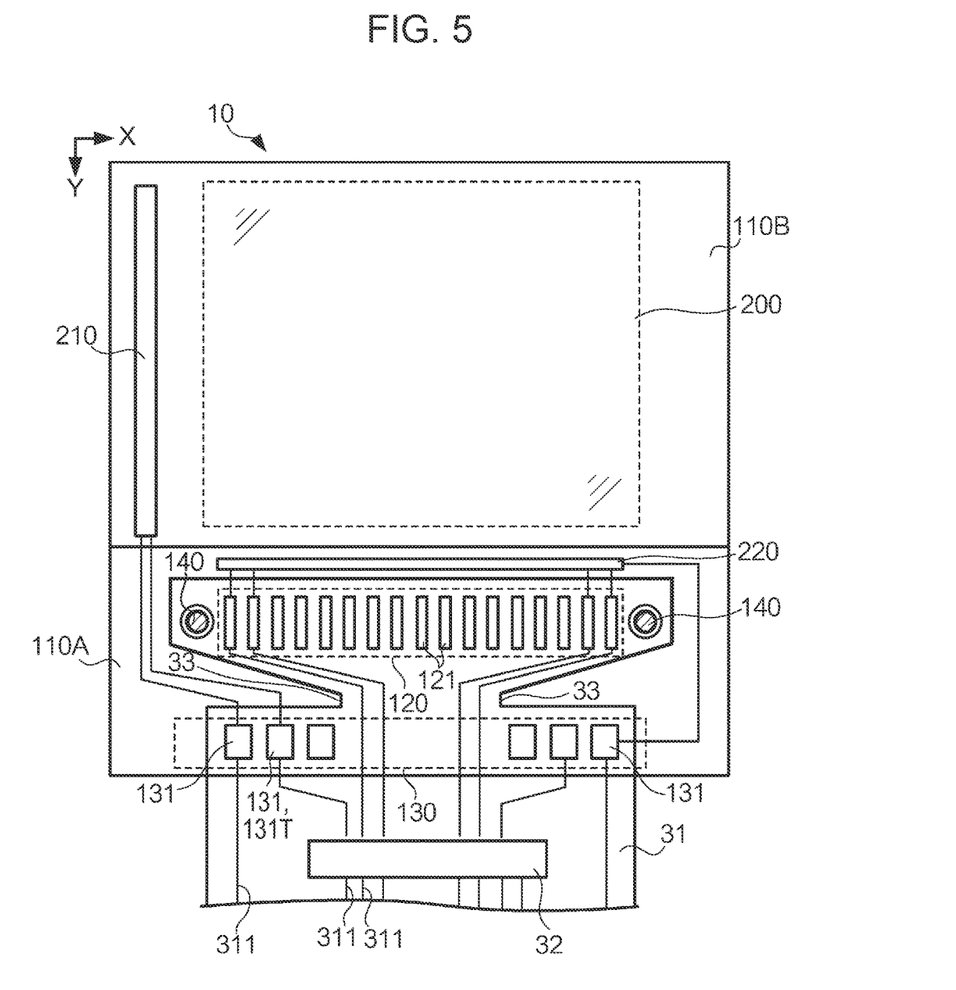
FIG. 5 is a plan view (viewed from the V direction in FIG. 1) of a liquid crystal panel according to the embodiment on which terminals are provided and a COF assembly is attached thereto.
Figure 6:
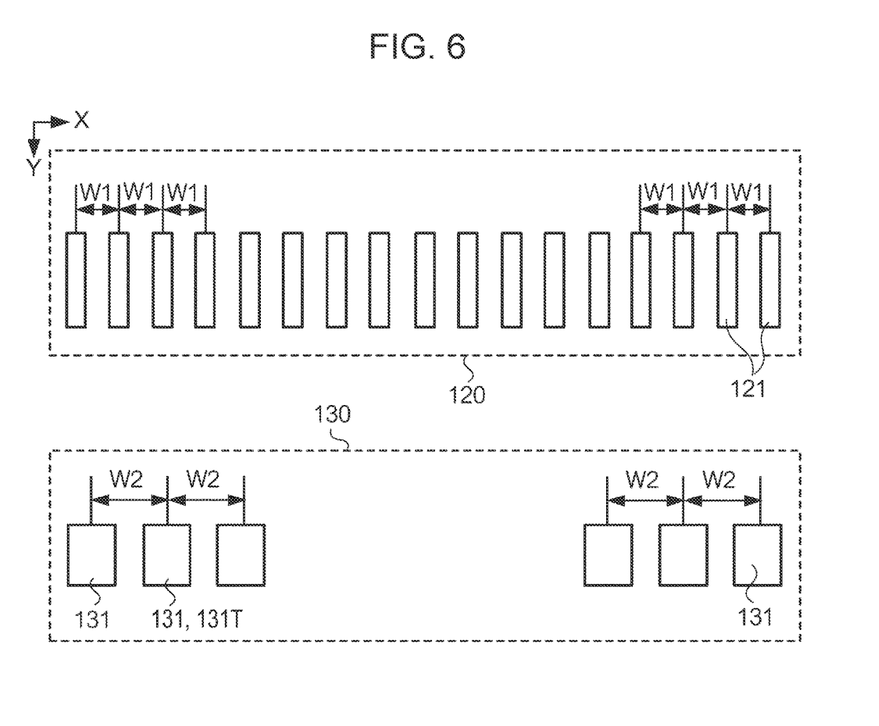
FIG. 6 illustrates an arrangement of the terminals on the liquid crystal panel according to the embodiment.

FIG. 4 is a plan view of the liquid crystal panel (upper surface) 10 on which the terminals are provided and the wiring board 30 is not attached thereto. FIG. 5 is a plan view (viewed from the V direction in FIG. 1) of the liquid crystal panel 10 on which the terminals are provided and the wiring board 30 is attached thereto. FIG. 6 illustrates an arrangement of the terminals on the liquid crystal panel 10. Although not illustrated in FIG. 5, on the back surface (lower surface) of the FPC 31 of the wiring board 30, electrical connection areas for the wires on the FPC 31 are provided at positions corresponding to respective terminals of a first terminal group 120 and a second terminal group 130. FIG. 5 illustrates only a part of the wires 311 on the FPC 31, and FIGS. 4 and 5 illustrate only a part of the wires on the liquid crystal panel 10.

The liquid crystal panel 10 has an element substrate 110A on which the plurality of pixels (pixels 250) are provided, and a counter substrate 110B on which a common electrode (not illustrated) is provided, which are bonded so as to form a certain space therebetween, and in this space, for example, a VA liquid crystal is sealed. The element substrate 110A and the counter substrate 110B are composed of materials having optical transparency such as glass and quartz.

The pixel area 200 is provided on a surface of the element substrate 110A that faces the counter substrate 110B. On the surface of the element substrate 110A that faces the counter substrate 110B, along a side of the peripheral edge area (hereinafter, may be simply referred to as a "peripheral area") of the pixel area 200 on the element substrate 110A, a scanning line drive circuit 210 is provided, and along another side that is perpendicular to the side, a data line drive circuit 220 is provided.

Along a side of the peripheral edge area on the element substrate 110A, specifically, along the same side of the data line drive circuit 220, the first terminal group 120 and the second terminal group 130 are provided. The first terminal group 120 includes a plurality of terminals 121 that are arranged in the X direction, and the first terminal group 120 is provided on the liquid crystal panel 10. In this embodiment, each of the terminals 121 has the same shape and the same dimensions, and has a rectangular shape in plan view of the surface on which the terminals are provided. In this embodiment, the terminals 121 are arranged at equal pitches. Specifically, the arrangement pitch of the terminals 121 in the first terminal group 120 is "W1", as illustrated in FIG. 6. In this embodiment, the arrangement pitch of the terminals is defined by a terminal pitch that corresponds to the distance between the central points of one terminal and its adjacent terminal in the X direction. To the terminals 121, various control signals (CtrX and CtrY) and various voltages may be input, and in this embodiment, at least the video signals Vid that are input to the data line drive circuit 220 are input. Accordingly, the number of the terminals 121 corresponds to the number of pixels 250 on the liquid crystal panel 10. For example, in full high definition (FHD), the number of the valid pixels in the horizontal direction is 1920, whereas in a partial driver mode (also referred to as a hybrid mode), the number of the terminals 121 can be calculated by dividing the number of the valid pixels by the number of demultiplexers. More specifically, if the liquid crystal panel 10 is a 1:8 demultiplexer, the number of the terminals 121 can be calculated by dividing 1920 by 8, that is, 240.

The second terminal group 130 is disposed at a position separated from the first terminal group 120 in the Y direction. The second terminal group 130 includes a plurality of terminals 131 that are arranged in the X direction, and the second terminal group 130 is provided on the liquid crystal panel 10. In this embodiment, each of the terminals 131 has the same shape and the same dimensions, and has a rectangular shape in plan view of the surface on which the terminals are provided. The arrangement pitch of the terminals in the second terminal group 130 is larger than that of the first terminal group 120. In this embodiment, the terminals 131 in the second terminal group 130 are classified (divided) into two groups located right and left on the surface where the terminals of the liquid crystal panel 10 are provided, and the terminals 131 are arranged at equal pitches in each group. Specifically, the arrangement pitch of the terminals 131 in the second terminal group 130 is "W2" (W2>W1), as illustrated in FIG. 6. For example, the arrangement pitch W1 is about several tens of micrometers, and the arrangement pitch W2 is about several hundred micrometers. The numbers of the terminals illustrated in the drawings are only examples, and alternatively, more terminals may be provided.

To the terminals 131, various control signals (CtrX and CtrY) and various voltages may be input. In this embodiment, the terminals 131 include a terminal to which a power-supply potential that is input to the scanning line drive circuit 210 is supplied, a terminal to which a power-supply potential that is input to the data line drive circuit 220 is supplied, and a terminal 131T. To the terminal 131T, signals for driving the liquid crystal panel 10 are input, and also inspection signals for inspecting the liquid crystal panel 10 are input. The terminal 131T is relatively wide, as described above, and the inspection signals can be supplied from a probe card. In a process before product shipment of the electrooptic device 1, a probe of a probe card is brought into contact with the terminal 131T to electrically inspect (for example, measure an electric resistance value) the liquid crystal panel 10, and thereby whether the product is a defective item or not can be inspected. As described above, the terminal 131T can also be used as the inspection terminal, and consequently, no terminal dedicated for inspection is to be separately provided for the liquid crystal panel 10.

The first terminal group 120 is disposed closer to the pixel area 200 than the second terminal group 130. Furthermore, on both sides of the terminals 121 of the first terminal group 120 in the X direction, alignment marks 140 are provided. The alignment marks 140 are used for positioning of the wiring board 30 to attach (crimp) the wiring board 30 to the liquid crystal panel 10. In the attachment process, an image of the alignment marks 140 is captured and recognized and thereby the attachment position of the wiring board 30 is determined. The alignment marks 140 correspond to the position of the first terminal group 120, but do not correspond to the position of the second terminal group 130. Accordingly, in the attachment process, the positioning of the wiring board 30 for electrical connection to the terminals 121 of the first terminal group is performed first, and then, the positioning of the wiring board 30 to the second terminal group 130 is performed. This attachment process increases the accuracy of the positioning of the wiring board 30 to the first terminal group, which has the relatively smaller terminal arrangement pitch, and the electrical connection between the terminals 121 and the wires 311 on the wiring board 30 can be ensured. Furthermore, since the arrangement pitch of the terminals 131 is relatively large, the accuracy of the positioning of the wiring board 30 to the second terminal group 130 can be ensured without a failure in the electrical connection with the wires 311 on the wiring board 30. In other words, the arrangement pitch of the terminals in the second terminal group 130 is to be determined so as not to cause an electrical connection failure. It should be noted that, in the electrooptic device 1, the alignment marks 140 may be provided for the second terminal group, or may be provided in an auxiliary manner.

Furthermore, the FPC 31 of the wiring board 30 has a notched section 33 provided in an area between the first terminal group 120 and the second terminal group 130 when the FPC 31 is attached to the liquid crystal panel 10. In this embodiment, the notched section 33 is provided such that the notched section 33 is gradually narrowed from the end part of the FPC 31 in the X direction toward the central part. In the process of attaching the wiring board 30, the wiring board 30 is positioned with reference to the position of the notched section provided in the FPC 31.

The notched section 33 has three main advantages. The first advantage is that the notched section 33 can be used to check the degree of expansion and contraction of the FPC 31 in the Y direction when the FPC 31 is attached to the liquid crystal panel 10, and thereby the accuracy of the simultaneous attachment of the first terminal group and the second terminal group can be managed. The second advantage is that unintentional contact of the wires of the FPC 31 and the liquid crystal panel 10 can be avoided. For wiring inspection (e.g., inter-wire short circuit inspection) during the manufacturing of the FPC 31, it is necessary to provide a contact for inspection in an area other than the mounted area for the wires in the FPC 31. For this purpose, it is preferable that a contact for inspection of the wires to be connected to the second terminal group be provided on the notched section 33. The contact for inspection is not necessary after the inter-wire inspection of the FPC 31. After the FPC 31 is attached to the liquid crystal panel 10, it is preferable that the contact be cut off together with the notched section 33 because the contact may cause unintentional electrical contact with the wires on the liquid crystal panel 10. The third advantage is reduction in the manufacturing cost of the FPC 31. The contact provided on the notched section 33 for inspection of the wires to be connected to the second terminal group enables effective use of the FPC tape in the width direction, and thereby the manufacturing cost can be reduced. It should be noted that, as an example modification in providing the notched section 33, instead of the recessed notched section, a hole shaped punched section may be used.

In this embodiment, the liquid crystal panel 10 has both the first terminal group 120 and the second terminal group 130, and accordingly, the total number of terminals provided on the liquid crystal panel 10 can be increased compared with a liquid crystal panel 10 that is provided with only a single terminal group. Furthermore, the side along which the terminal groups are mounted is the same side along which the data line drive circuit 220 is mounted, and thereby the wires can be readily routed even if the number of the terminals is increased.

Figure 7:
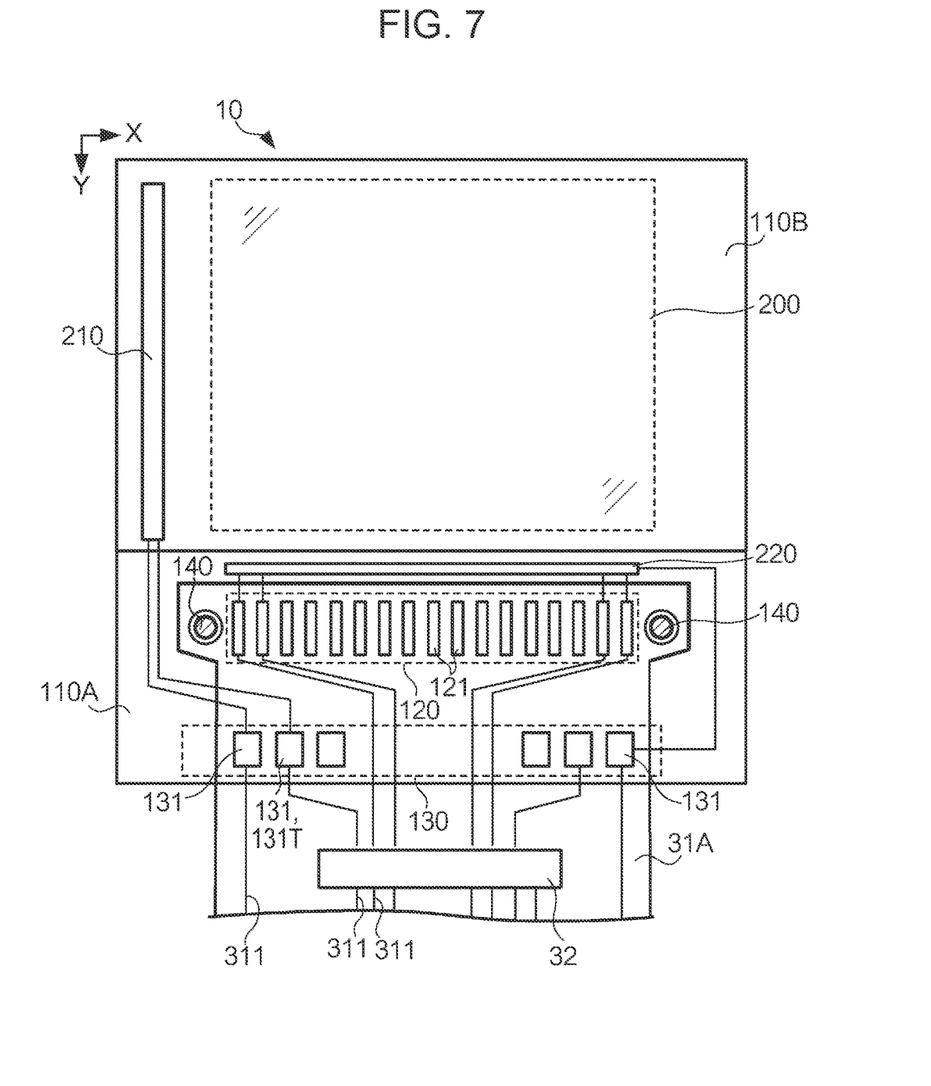
FIG. 7 is a plan view of a liquid crystal panel according to a modification of the invention to which a COF assembly is attached.

Embodiments different from the above-described embodiment of the present invention may be provided. It should be noted that example modifications described below may be appropriately combined. As illustrated in FIG. 7, if the wiring board 30 has a margin for manufacturing tolerances and there are no limitations in the manufacturing cost and the like, an FPC 31A that is not provided with the notched section 33 may be provided. The FPC 31A has a configuration similar to that of the FPC 31 except for the absence of the notched section 33.

In the above-described embodiment, the first terminal group 120 having the relatively small terminal arrangement pitch is disposed at a location closer to the pixel area 200 than the second terminal group 130 having the relatively large terminal arrangement pitch. Alternatively, the second terminal group 130 having the relatively large terminal arrangement pitch may be disposed at a location closer to the pixel area 200 than the first terminal group 120 having the relatively small terminal arrangement pitch. In such a case, the alignment marks 140 are provided at positions corresponding to the first terminal group 120.

The liquid crystal panel 10 may have three or more terminal groups which have different terminal arrangement pitches, respectively. When three or more terminal groups are provided, to facilitate the alignment operation, it is preferable that the terminal group that has the smallest terminal arrangement pitch, more specifically, the terminal group whose smallest arrangement pitch is smaller than other terminal groups, be provided at a position closer to the pixel area 200. On the side of the pixel area, the counter substrate end is disposed, and to prevent interference with the counter substrate end, precise attachment of the FPC or the COF assembly is required. Furthermore, it is not always necessary that all pitches between terminals in a terminal group be equal pitches. In such a case, a maximum pitch in the terminal group is smaller than a minimum pitch in the other terminal groups.

In place of the wiring board 30, an FPC (i.e., only the FPC 31) on which the integrated circuit 32 is not provided may be attached to the liquid crystal panel 10. In such a case, the FPC 31 serves as a wiring board for supplying various signals and various potentials supplied from a circuit on a higher level to the liquid crystal panel 10 via the wires 311.

The electrooptic panel according to the embodiments of the invention may not be the transmissive liquid crystal panel, and alternatively, for example, a reflective liquid crystal panel may be employed. Furthermore, as long as the electrooptic panel can perform electrooptic operations, the electrooptic panel according to the embodiments of the invention may be a panel that uses an electrooptic element other than the liquid crystal, for example, an organic electroluminescence (EL) panel may be employed.

Figure 8:
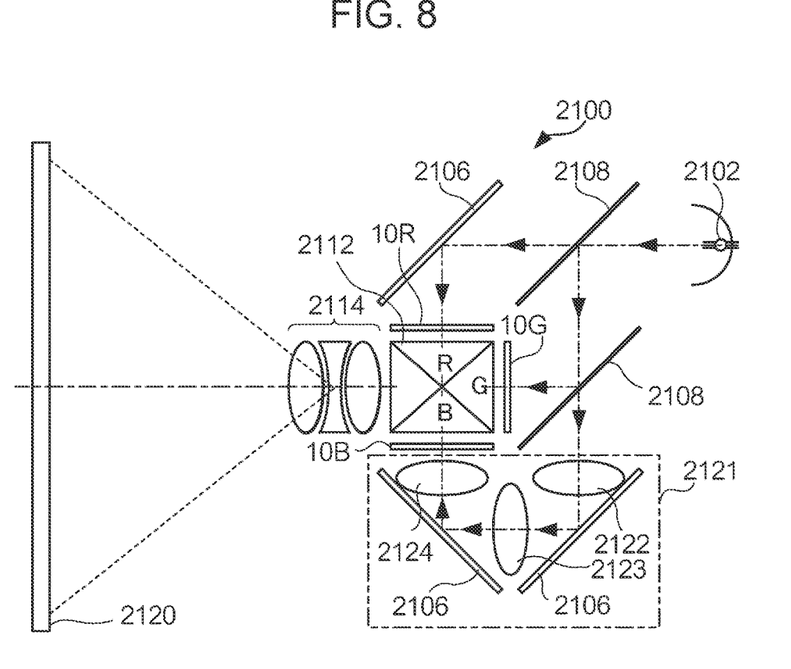
FIG. 8 illustrates a projector to which an electrooptic device according to the embodiment of the invention is applied.

Now, a projection display device (projector) that uses the liquid crystal panel 10 as a light valve is described as an example electronic device that uses the electrooptic device 1 according to the above-described embodiments. FIG. 8 is a plan view illustrating a structure of the projector. As illustrated in FIG. 8, a lamp unit 2102 that includes a white light source such as a halogen lamp is provided in a projector 2100. The projection light emitted from the lamp unit 2102 is separated into the three primary colors of red (R), green (G), and blue (B) by three mirrors 2106 and two dichroic mirrors 2108, and guided to light valves 10R, 10G, and 10B corresponding to respective primary colors. The blue light has a longer optical path than those of the red light and green light, and to prevent a loss of the blue light, the light is guided via a relay lens system 2121 that includes an incident lens 2122, a relay lens 2123, and a light-emitting lens 2124.

In this projector 2100, three sets of electrooptic devices 1 each including the liquid crystal panel 10 are provided for red, green, and blue. The structures of the light valves 10R, 10G, and 10B are similar to that of the above-described liquid crystal panel 10. The light valves 10R, 10G, and 10B are driven respectively in response to supply of video signals of respective primary color components of red, green, and blue from an external circuit on a higher level. The light modulated by the light valves 10R, 10G, and 10B enters a dichroic prism 2112 from three directions. In the dichroic prism 2112, red light and blue light are refracted at an angle of 90 degrees, whereas green light proceeds straight ahead. Accordingly, after the images of respective primary colors are combined, a color image is projected on a screen 2120 by a projection lens 2114.

Light components corresponding to the respective colors of red, green, and blue enter the light valves 10R, 10G, and 10B via the dichroic mirrors 2108, and accordingly, it is not necessary to provide color filters. The images transmitted through the light valves 10R and 10B are reflected and projected by the dichroic prism 2112, whereas the image transmitted through the light valve 10G is directly projected. Accordingly, the horizontal scanning directions by the light valves 10R and 10B are changed to the direction opposite to the horizontal scanning direction by the light valve 10G to display images that are reversed left to right.

The electronic device may be, instead of the projector described with reference to FIG. 8, for example, a television set, a view-finder-type or monitor-direct-view-type video tape recorder, a car navigation device, a pager, an electronic notebook, a calculator, a word processor, a workstation, a TV phone, a POS terminal, a digital still camera, a cellular phone, a smart phone, a tablet terminal, or a device equipped with a touch panel. Furthermore, the electrooptic device 1 may be applied to the above-described electronic devices.

This application claims priority from Japanese Patent Application No. 2015-256069 filed in the Japanese Patent Office on Dec. 28, 2015, the entire disclosure of which is hereby incorporated by reference in its entirely.

What is claimed is:

1. An electrooptic device comprising:
an electrooptic panel;
a first terminal group provided on the electrooptic panel, the first terminal group including a plurality of terminals arranged in a first direction; and
a second terminal group provided on the electrooptic panel at a position separated from the first terminal group in a second direction different from the first direction, the second terminal group including a plurality of terminals arranged in the first direction at a terminal arrangement pitch different from that of the first terminal group,
wherein a wiring board having an integrated circuit for supplying signals to at least one of the terminals in the first terminal group and the second terminal group is attached to the electrooptic panel, and
wherein the wiring board has a notched section provided in an area between a part corresponding to the first terminal group and a part corresponding to the second terminal group.

2. The electrooptic device according to claim 1, wherein one of the terminals in one terminal group not having a smallest arrangement pitch from the first terminal group and the second terminal group is used as an inspection terminal to which signals for inspecting the electrooptic panel are input.

3. The electrooptic device according to claim 1, wherein the electrooptic panel has a plurality of pixels, the first terminal group is provided at a position closer to the pixels than the second terminal group, and a maximum arrangement pitch in the first terminal group is smaller than a smallest arrangement pitch in the second terminal group.

4. The electrooptic device according to claim 3, wherein the first terminal group includes a terminal to which signals for supplying video signals to each of the pixels are input.

5. An electronic device comprising the electrooptic device according to claim 1.

6. An electrooptic device comprising:
an electrooptic panel;
a first terminal group provided on the electrooptic panel, the first terminal group including a plurality of terminals arranged in a first direction; and
a second terminal group provided on the electrooptic panel at a position separated from the first terminal group in a second direction different from the first direction, the second terminal group including a plurality of terminals arranged in the first direction at a terminal arrangement pitch different from that of the first terminal group,
wherein a wiring board having an integrated circuit for supplying signals to at least one of the terminals in the first terminal group and the second terminal group is attached to the electrooptic panel, and
wherein alignment marks are provided such that the wiring board is positioned at a location corresponding to at least one terminal group having a smallest arrangement pitch from the first terminal group and the second terminal group.

7. An electrooptic device comprising:
an electrooptic panel;
a first terminal group provided on the electrooptic panel, the first terminal group including a plurality of terminals arranged in a first direction; and
a second terminal group provided on the electrooptic panel at a position separated from the first terminal group in a second direction different from the first direction, the second terminal group including a plurality of terminals arranged in the first direction at a terminal arrangement pitch different from that of the first terminal group,
wherein a wiring board having a wire electrically connected to at least one of the terminals in the first terminal group and the second terminal group is attached to the electrooptic panel, and
wherein the wiring board has a notched section provided in an area between a part corresponding to the first terminal group and a part corresponding to the second terminal group.

8. An electrooptic device comprising:
an electrooptic panel;
a first terminal group provided on the electrooptic panel, the first terminal group including a plurality of terminals arranged in a first direction; and
a second terminal group provided on the electrooptic panel at a position separated from the first terminal group in a second direction different from the first direction, the second terminal group including a plurality of terminals arranged in the first direction at a terminal arrangement pitch different from that of the first terminal group,
wherein a wiring board having a wire electrically connected to at least one of the terminals in the first terminal group and the second terminal group is attached to the electrooptic panel, and
wherein alignment marks are provided such that the wiring board is positioned at a location corresponding to at least one terminal group having a smallest arrangement pitch from the first terminal group and the second terminal group.

* * * * *